United States Patent
Munko et al.

(10) Patent No.: US 8,336,364 B2
(45) Date of Patent: Dec. 25, 2012

(54) METHOD AND APPARATUS FOR CALIBRATING WHEEL SPEEDS

(75) Inventors: Tobias Munko, Hannover (DE); Axel Stender, Hameln (DE); Gerhard Ruhnau, Neustadt (DE); Ingo Tha, Hannover (DE)

(73) Assignee: WABCO GmbH, Hannover (DE)

( * ) Notice: Subject to any disclaimer, the term of this patent is extended or adjusted under 35 U.S.C. 154(b) by 934 days.

(21) Appl. No.: 12/322,710

(22) Filed: Feb. 4, 2009

(65) Prior Publication Data

US 2009/0205401 A1    Aug. 20, 2009

(30) Foreign Application Priority Data

Feb. 16, 2008   (DE) .................. 10 2008 009 522

(51) Int. Cl.
  *G01P 21/00*   (2006.01)
(52) U.S. Cl. .......................... 73/1.37; 702/96
(58) Field of Classification Search ......... 73/1.37–1.38; 702/96
  See application file for complete search history.

(56) References Cited

U.S. PATENT DOCUMENTS

| | | | | |
|---|---|---|---|---|
| 3,719,399 A * | 3/1973 | Adahan | .................. | 303/159 |
| 3,758,765 A * | 9/1973 | Vietor | .................. | 701/18 |
| 4,322,790 A * | 3/1982 | Wolfinger | .................. | 363/148 |
| 5,237,862 A * | 8/1993 | Mangrulkar et al. | ...... | 73/114.04 |
| 5,984,238 A * | 11/1999 | Surauer et al. | .................. | 244/171 |
| 6,216,080 B1 | 4/2001 | Riedemann et al. | | |
| 6,224,171 B1 | 5/2001 | Riedemann et al. | | |
| 6,295,507 B1 * | 9/2001 | Sasamoto et al. | .............. | 702/104 |
| 6,382,018 B2 * | 5/2002 | Knestel | .................. | 73/117.01 |
| 6,591,178 B2 * | 7/2003 | Krueger et al. | .................. | 701/83 |
| 6,715,287 B1 * | 4/2004 | Engel et al. | .................. | 60/601 |
| 7,076,991 B2 * | 7/2006 | Umeda | .................. | 73/1.39 |
| 2004/0254703 A1 | 12/2004 | Traechtler et al. | | |
| 2005/0060082 A1 | 3/2005 | Heuer et al. | | |
| 2006/0184300 A1 * | 8/2006 | Schubert et al. | .................. | 701/45 |
| 2008/0307853 A1 * | 12/2008 | Siebers et al. | .................. | 73/1.29 |

FOREIGN PATENT DOCUMENTS

| | | | |
|---|---|---|---|
| DE | 19527112 C1 * | 9/1996 | |
| DE | 197 47 689 B4 | 5/1999 | |
| DE | 198 54 788 A1 | 5/2000 | |
| DE | 101 35 020 A1 | 2/2003 | |
| DE | 103 38 879 A1 | 3/2005 | |
| DE | 102006003674 A1 * | 8/2007 | |
| EP | 391647 A2 * | 10/1990 | |
| SU | 922547 B * | 4/1982 | |

OTHER PUBLICATIONS

Andrew Zimmerman Jones, Acceleration, © 2012, About.com, 1 page, downloaded Aug. 17, 2012 from http://physics.about.com/od/glossary/g/acceleration.htm.*

* cited by examiner

*Primary Examiner* — Thomas P Noland
(74) *Attorney, Agent, or Firm* — Kramer Levin Naftalis & Frankel LLP

(57) ABSTRACT

A method and apparatus for calibrating wheel speed signals measured by wheel rpm sensors in a vehicle equipped with at least one longitudinal acceleration sensor integrates the signal of the longitudinal acceleration sensor during the acceleration or deceleration phases of the vehicle, and the resulting vehicle speed signal is compared against the signals of the individual wheel rpm sensors. A determination is made as to whether a deviation that may exist for a wheel lies within a predefined tolerance range. If a deviation falls outside of the tolerance range, the parameterized tire circumference of the associated wheel is adaptively recalibrated until the deviation falls within the tolerance range.

9 Claims, 1 Drawing Sheet

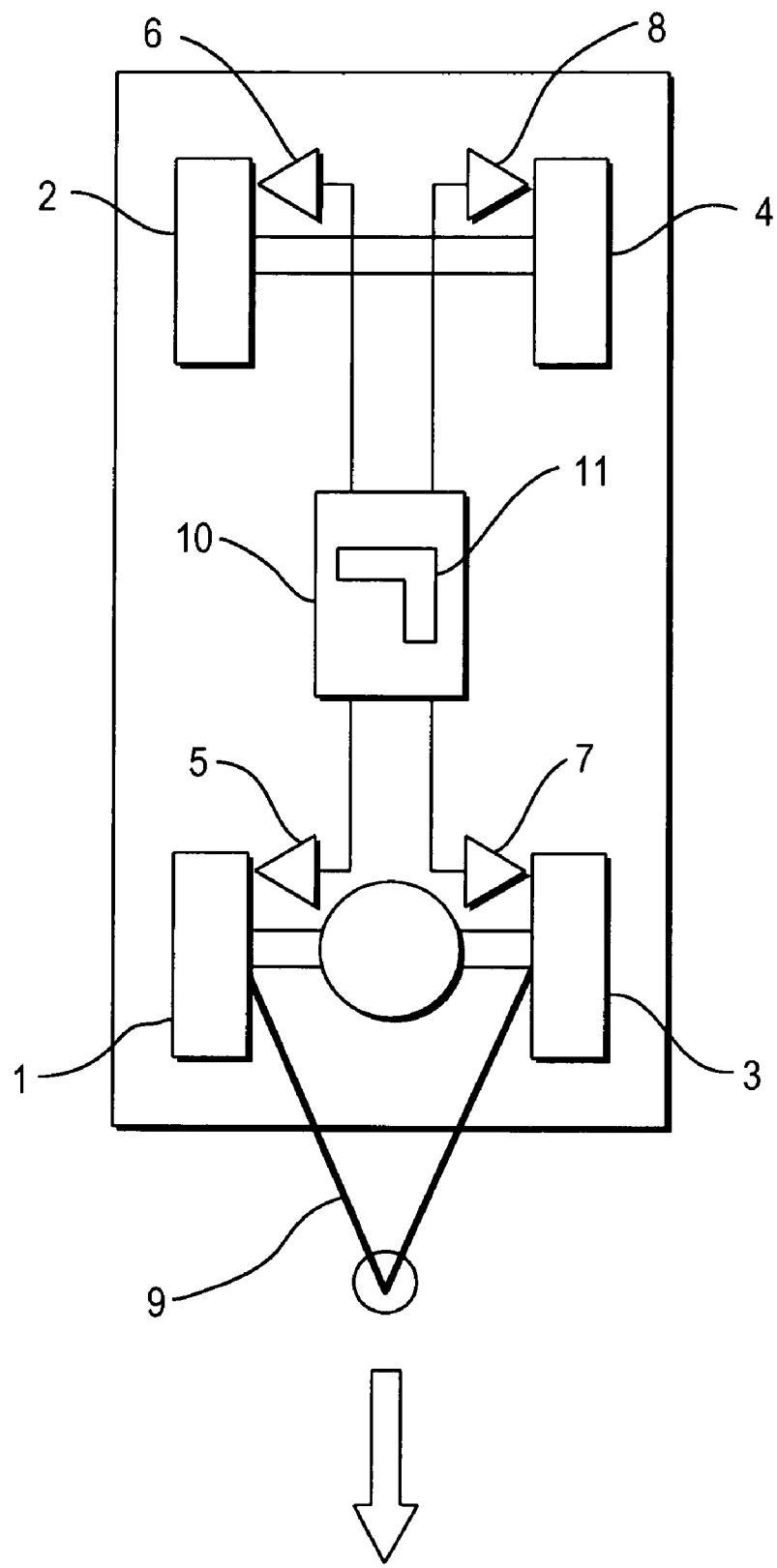

METHOD AND APPARATUS FOR CALIBRATING WHEEL SPEEDS

FIELD OF THE INVENTION

The present invention generally relates to a method and apparatus for calibrating vehicle wheel speed signals.

BACKGROUND OF THE INVENTION

Systems for improving driving stability in vehicles, especially commercial vehicles (e.g., tractors or trailers), are known. Examples include anti-lock braking systems ("ABS", see e.g., DE 19747689 B4), electronic braking systems ("EBS", see e.g., DE 19854788 A1), electronic stability control ("ESC") systems (see e.g., DE 10338879 A1) and rollover stability systems ("RSS", see e.g., DE 10135020 A1). For all of these systems, it is important to be able to determine both the speeds of the individual wheels and the speed of the vehicle as precisely as possible.

Wheel sensors are typically used to measure wheel speeds. These comprise fixed sensors that are sensitive to magnetic fields. The sensors sense toothed rings that revolve with the wheels. Each toothed ring usually has 100 or 80 teeth. The values of wheel revolutions per minute ("rpm") measured in this way are transmitted to the electronic control units of the various vehicle stability systems noted above and further processed therein.

Vehicle speed is calculated from the individual wheel speeds in accordance with certain known equations. Thus, vehicle speed depends on the size or circumference of the mounted tires. Knowledge of the tire size is therefore necessary for the most accurate determination of vehicle speed.

During vehicle manufacture, the appropriate tires are fitted and, at the end of the assembly line, their size is communicated to the respective built-in electronic control units or is parameterized. After the vehicle has been operated for some time, however, the values for the tires may change. For example, tires having diameters which differ from the diameters of the original tires may be installed. Furthermore, the diameters of the original tires may be reduced by wear. Consequently, the original parameterized tire sizes are no longer applicable, and an exact calculation of the vehicle speed is no longer possible. For example, worn tires will result in an erroneous increase in calculated vehicle speed since worn tires revolve at higher rates.

For individual tires with wheel speeds that deviate significantly from the calculated vehicle speed, an rpm correction ("tire compensation") factor can be applied by the electronic control units of the various vehicle stability systems to ensure that the tire speeds as processed in the electronic control units match the speeds of the other tires. Nevertheless, this conventional compensation approach is problematic when all tire sizes deviate equally from the value originally parameterized by the manufacturer. In such case, vehicle speed may be incorrectly calculated by the electronic control units, and the correct functioning of the vehicle stability systems relying on the vehicle speed calculation cannot be assured.

Knowledge of the precise vehicle speed is particularly important for RSS, which is intended to prevent vehicle rollover on curves. With RSS, lateral acceleration of the vehicle is determined while it is traveling on a curve, and, if this exceeds a limit value, the vehicle is automatically braked. Lateral acceleration can either be measured by a separate lateral acceleration sensor or calculated from the difference of the values of wheel rpm of the right and left sides of the vehicle. A deviation between parameterized tire size and actual tire size can lead to erroneous calculation of wheel speeds. Such errors are raised to the power of two in the calculation of vehicle lateral acceleration.

If, as mentioned above, vehicle speed is overestimated because of worn tires, the vehicle may be braked too early. Thus, full advantage of the limit for rollover prevention is not taken, since the vehicle is actually traveling more slowly than assumed by the electronic control unit of the vehicle's stability system. If, on the other hand, vehicle speed is underestimated by the electronic control unit, the vehicle may be braked too late to prevent rollover.

SUMMARY OF THE INVENTION

Generally speaking, in accordance with the present invention, a vehicle wheel speed calibration method and apparatus are provided which overcome deficiencies associated with conventional vehicle stability systems.

In accordance with one embodiment of the present invention, a method for calibrating wheel speed signals of wheel rpm sensors during vehicle acceleration/deceleration includes integrating signals of at least one longitudinal acceleration sensor to yield a vehicle speed, and comparing the vehicle speed against wheel speed signals of individual wheel rpm sensors. Any difference between the vehicle speed and the wheel speed signals is identified, and, when a difference is identified, a determination is made as to whether the difference falls within a predefined tolerance range. When a difference falls outside of the predefined tolerance range, a parameterized tire circumference of the associated wheel is adaptively recalibrated until the difference falls within the predefined tolerance range.

In accordance with another embodiment of the present invention, the signals of the rpm sensors are differentiated during the vehicle's acceleration or deceleration phases, and the vehicle acceleration/deceleration signals obtained are compared with the signals of the longitudinal acceleration sensor. A tolerance range is evaluated and one or more deviating tire diameters are recalibrated until the deviation falls within the tolerance range.

Accordingly, it is an object of the present invention to provide a method and apparatus for correcting vehicle speed determined from wheel rpm values, wherein differences in tire diameters are accurately compensated for.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawing in which:

FIG. 1 is a schematic diagram depicting a trailer vehicle equipped with a towbar, wheels and an electronic control unit (e.g., of an ABS, EBS, ESC or RSS).

DETAILED DESCRIPTION OF THE PREFERRED EMBODIMENTS

Referring to FIG. 1, in accordance with a preferred embodiment of the present invention, a trailer vehicle (12)

includes an electronic control unit (10) equipped with at least one longitudinal acceleration sensor (11). Vehicle electronic control units equipped with longitudinal acceleration sensors are known (see e.g., DE 102006003674 A1)—however, it will be appreciated that, conventionally, such units are employed to detect driving direction and are neither adapted nor utilized for effecting a method according to embodiments of the present invention.

During certain acceleration or deceleration phases of the vehicle, the signals of longitudinal acceleration sensor (11) are integrated to yield a vehicle speed and compared with the speed signals of individual wheel rpm sensors (5, 6, 7, 8). A check is performed for each wheel to determine whether a difference exists between the vehicle speed and speed signal values and whether this falls within a tolerance range. If a deviation from the tolerance range is detected for individual wheels, the parameterized tire circumference is adaptively recalibrated until the difference falls within the tolerance range. Such a tolerance range can permit a deviation of 0 to 2% of the vehicle speed for the individual wheel speeds.

Alternatively, the signals of the rpm sensors can be differentiated during the vehicle's acceleration or deceleration phases, and the vehicle deceleration signals or acceleration signals obtained in this way can be compared with the signals of the longitudinal acceleration sensor. In this case also, a tolerance range is evaluated and one or more deviating tire diameters are recalibrated until the deviation falls within the tolerance range.

To ensure that the method according to embodiments of the present invention operates as flawlessly as possible, it is preferably employed only in certain well-defined driving situations. Expediently, the inventive method is implemented only so long as no ABS regulation is running—with increased wheel slip, the rpm signals of the wheels do not correspond to vehicle speed.

Furthermore, expediently, the measured longitudinal acceleration is evaluated only when:

(i) an error due to an offset of longitudinal acceleration sensor (11) has been compensated for by electronic control unit (10);
(ii) errors due to an installation angle of longitudinal acceleration sensor (11) have been compensated for by electronic control unit (10);
(iii) the vehicle is not traveling uphill or downhill (the existence of an uphill or downhill driving situation can be detected by known methods)—in such situations, the values of the acceleration sensor would be falsified by the superposed force of gravity; and/or
(iv) it falls within certain limits—for example, acceleration values that are too high or too low as measured by the longitudinal acceleration sensor may be less accurate and are not used.

All of the foregoing restrictions can be applied individually or in combination.

The inventive method is preferably employed for a trailer vehicle, especially because a tachometer signal, such as is present in the tractor, is not available in the trailer for monitoring the wheel rpm sensors. Although transmission of the tachometer signal from the tractor to the trailer is conceivable, for technical reasons it is not easily implemented.

The method according to embodiments of the present invention is expediently implemented by supplementing an existing ABS, EBS, ESC or RSS electronic control unit with a longitudinal acceleration sensor, or by replacing a lateral-acceleration sensor already present in an RSS electronic control unit, with an acceleration sensor that measures in at least two dimensions, or, in other words, in lateral and longitudinal directions.

The present invention offers the advantage that it eliminates the need for parameterization of the tire size by the vehicle manufacturer at the end of the assembly line. With the present invention, it is possible to achieve calibration automatically during driving. Indeed, even an incorrect number of teeth of a pole wheel can be recalibrated. In this way, a tire change or tire wear will not cause impairment of the vehicle stability function.

It will thus be seen that the objects set forth above, among those made apparent from the preceding description, are efficiently attained, and since certain changes may be made in carrying out the above method without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a vehicle including at least one longitudinal acceleration sensor, wheels having tires, and wheel rpm sensors, a method for calibrating wheel speed signals of said wheel rpm sensors during vehicle acceleration or deceleration, comprising the steps of differentiating signals of said wheel rpm sensors to yield vehicle acceleration or deceleration signals; and comparing said vehicle acceleration or deceleration signals against signals of said at least one longitudinal acceleration sensor, wherein said step of comparing said vehicle acceleration or deceleration signals against said signals of said at least one longitudinal acceleration sensor includes identifying any difference between ones of said vehicle acceleration or deceleration signals and said signals of said at least one longitudinal acceleration sensor, and, when a difference is identified, determining whether said difference falls within a predefined tolerance range.

2. The method according to claim 1, wherein when said difference falls outside of said predefined tolerance range, further comprising the step of adaptively recalibrating a parameterized tire circumference of ones of said wheels associated with said difference until said difference falls within said predefined tolerance range.

3. The method according to claim 1, wherein said step of comparing said vehicle acceleration/deceleration signals against signals of said at least one longitudinal acceleration sensor is effected only when no ABS regulation is in effect.

4. The method according to claim 1, wherein said step of comparing said vehicle acceleration/deceleration signals against signals of said at least one longitudinal acceleration sensor is effected only when error due to an offset of said at least one longitudinal acceleration sensor has been compensated for.

5. The method according to claim 1, wherein said step of comparing said vehicle acceleration/deceleration signals against signals of said at least one longitudinal acceleration sensor is effected only when error due to an installation angle of said at least one longitudinal acceleration sensor has been compensated for.

6. The method according to claim 1, wherein said step of comparing said vehicle acceleration/deceleration signals against signals of said at least one longitudinal acceleration sensor is effected only when said vehicle is not traveling uphill or downhill.

7. The method according to claim 1, wherein said vehicle is a trailer.

8. An apparatus for effecting a method for calibrating wheel speed signals of wheel rpm sensors during vehicle acceleration/deceleration according to claim 1, said apparatus comprising an electronic control unit for at least one of an ABS, EBS, ESC and RSS, said electronic control unit including an acceleration sensor configured to measure in at least two dimensions.

9. In a vehicle including at least one longitudinal acceleration sensor, wheels having tires, and wheel rpm sensors, a method for calibrating wheel speed signals of said wheel rpm sensors during vehicle acceleration or deceleration, comprising the steps of differentiating signals of said wheel rpm sensors to yield vehicle acceleration or deceleration signals; and comparing said vehicle acceleration or deceleration signals against signals of said at least one longitudinal acceleration sensor, wherein said step of comparing said vehicle acceleration or deceleration signals against signals of said at least one longitudinal acceleration sensor is effected only when said signals of said at least one longitudinal acceleration sensor fall within predefined limits.

* * * * *